Patented Mar. 22, 1932

1,850,928

UNITED STATES PATENT OFFICE

FRANK B. GREEN, OF NEW YORK, N. Y.

FLOOR COVERING

No Drawing.      Application filed June 1, 1929. Serial No. 367,828.

This invention relates to floor coverings, particularly composition floor coverings which are colored or upon which a pattern is printed. The invention is especially useful in connection with colored floor tiling, although its use is not limited thereto.

One object of the invention is the formation of a hard, tough, impenetrable floor covering which is not slippery when wet. Another object is the provision of a floor covering which is light, or varied in color. Other objects will be apparent when the following description is considered.

In the past floor coverings which are light and varied in color have been made of rubber. Such floor coverings are rarely hard, are not tough nor impenetrable. Furthermore, rubber floor coverings become slippery when wet, and are expensive.

Some of the objections to rubber floor covering are avoided by using asphaltic floor covering, which is made with a filler of asbestos. Such material is not excessively slippery when wet, and it is considerably tougher than the rubber material.

One great disadvantage of the asphaltic floor covering is that the coloring effects which may be obtained with it are very limited. Also it is impossible to obtain light colors when this material is used. Printing a pattern upon this type of floor covering is therefore difficult or impossible. For these reasons asphaltic floor covering, including asphaltic floor tiling, can be used only in public buildings.

I have discovered that a floor covering may be made which is free from the objections to which the rubber and asphaltic floor tilings are subject, and which will realize the objects above enumerated. To this end I incorporate with an inert filler a copal crop gum which has a high melting point and medium hardness. As is well known, a copal gum is a sap gum, and crop gums are those procured from living trees. A preferred type of inert filler is asbestos. The gum may have added to it certain other substances to break it down, (that is to say lower its melting point), in order that it may be incorporated with the asbestos filler. A further substance may be added to cheapen the product.

More specifically I may incorporate with an asbestos filler a copal crop gum having a melting point between 150 degrees centigrade and 220 degrees centigrade and having also a medium hardness. I prefer to employ a gum having a melting point between 180° and 200° centigrade. I also prefer to employ a gum having a hardness of about 13 on a scale of hardness for copal gums ranging from 1 to 22, where 1 represents Zanzibar gum which is hardest and 22 represents Cochin China gum which is softest. The scale of hardness referred to is one which is well known in the art. Gums Nos. 1 to 3 are rated as hard; Nos. 4 to 16 are rated as medium; and Nos. 17 to 22 are rated as soft. Congo gum, for instance, has a hardness of 13 on this scale, and is therefore rated as medium. I also prefer to mix with this in lesser proportions a spirit varnish resin and Chinawood oil.

While a high a melting point of the gum is desired in order to obtain durability and impenetrability, too high a melting point may result in danger of attaining the flash point of the gum, and may also produce a brittle product. I employ the expression "high melting point" to designate a temperature of substantially between 150° and 220° C., which is sufficiently high to give the desired durability and impenetrability in the finished product, but not sufficiently high to make possible attaining the flash point of the gum, or a brittle product.

Where the hardness of the gum employed is much greater than 13 the product is brittle. Where it is much less the product is insufficiently resistive.

I have found that Congo gum is an excellent gum for use in making my floor covering. I also find that gum elemi is well adapted for mixing with this gum, together with Chinawood oil, and that cotton seed pitch serves very satisfactorily as an adulterant with which to cheapen the product.

The gum mixture and the adulterant are incorporated with the asbestos filler exactly as the asphalt would be incorporated if asphaltic floor covering were being made. Substantially the only difference is that higher temperatures are required in the present invention.

As an example of how the invention may be applied the following may be given:

*Example*

First Congo gum is melted at a sufficient temperature to reduce it to a homogeneous liquid.

Then a mixture is made consisting of—
67% of Congo gum
3% of gum elemi
30% of Chinawood oil.

This mixture is brought to a temperature of about 107° to 121° C. and to it there is added cotton seed pitch in the proportion of 75% of the mixture and 25% of cotton seed pitch, that is to say cotton seed pitch is added in the proportion of one to three.

Next the pigment is added.

The resulting mixture is now put in a "rubber mill" having hot rolls. When the mixture sticks to the rolls, asbestos is added. The action of the rolls incorporates the mixture with the asbestos in well known manner.

The coloring effects may, of course, be varied.

I have found it best, where a white material is desired, to omit the cotton seed pitch, and to substitute gum elemi therefor.

The resulting floor covering is hard, tough, impenetrable, and does not become slippery when wet. It is durable, inexpensive, and may be made in any desired color including the lighest shades. When made into tiles, very pleasing floor patterns can be arranged, and all or any desired part of the tiles may be of light color. This makes it possible to employ tiles made in accordance with the present invention on porches, in halls, bath rooms, conservatories, etc., in private homes, where the slippery rubber tiling would not be used and where the dark colored asbestos tiling would be inappropriate.

I do not desire to be limited by the particular substances named or the specific example here given. Variations which come within the proper scope of the present invention will quite naturally occur to those dealing with the floor covering problem.

I claim:

1. A floor covering comprising an African copal crop gum, a spirit varnish resin and an asbestor filler.

2. A floor covering comprising an African copal crop gum, a spirit varnish resin, an adulterant, and an asbestos filler.

3. A floor covering comprising an African copal crop gum having a melting point of between 180 and 200 degrees centigrade and a medium hardness, spirit varnish resin, and Chinawood oil, in combination with a filler.

4. A floor covering comprising Congo gum, gum elemi and Chinawood oil, incorporated with a filler.

5. A floor covering comprising Congo gum, gum elemi, Chinawood oil, and cotton seed pitch, incorporated with an asbestos filler.

6. A floor covering comprising a mixture of 67 per cent. Congo gum, 3 per cent. gum elemi, and 30 per cent. Chinawood oil, incorporated with an asbestos filler.

7. A floor covering comprising 75 per cent. Congo gum, gum elemi, and Chinawood oil, in combination with 25 per cent. cotton seed pitch, incorporated with an asbestos filler.

8. A floor covering comprising a mixture 75 per cent. of which consists of 67 per cent. Congo gum, 3 per cent. gum elemi, and 30 per cent. Chinawood oil, and 25 per cent. of which consists of cotton seed pitch, said mixture being incorporated with an asbestos filler, substantially as described.

9. A process for making a floor covering comprising mixing Congo gum, gum elemi, and Chinawood oil, melting the mixture, adding cotton seed pitch and adding pigment.

10. A process for making a floor covering comprising mixing Congo gum, gum elemi, and Chinawood oil, melting the mixture, adding cotton seed pitch, adding pigment, and incorporating the result with asbestos.

11. A process for making floor covering comprising making a mixture of 67 per cent. Congo gum, 3 per cent. gum elemi, and 30 per cent. Chinawood oil, melting the mixture, adding cotton seed pitch to the mixture in the proportion of one to three, adding pigment, and incorporating the result with asbestos, substantially as described.

In testimony whereof I have signed my name to this specification.

FRANK B. GREEN.